United States Patent
Bogle et al.

(10) Patent No.: US 7,139,121 B2
(45) Date of Patent: Nov. 21, 2006

(54) PROJECTION MICROSCOPE

(75) Inventors: Alan W. Bogle, Neosho, MO (US); Russell H. Bogle, Neosho, MO (US)

(73) Assignee: Quickmate Company, Inc, Neosho, MO (US)

(*) Notice: Subject to any disclaimer, the term of this patent is extended or adjusted under 35 U.S.C. 154(b) by 0 days.

(21) Appl. No.: 10/871,078

(22) Filed: Jun. 18, 2004

(65) Prior Publication Data
US 2005/0280891 A1    Dec. 22, 2005

(51) Int. Cl.
*G02B 21/00* (2006.01)
(52) U.S. Cl. ............ 359/382; 359/368; 359/372; 359/380
(58) Field of Classification Search ............ 359/382, 359/383, 392, 368, 362, 369, 372, 363, 389, 359/390, 385, 642, 656, 379, 380
See application file for complete search history.

(56) References Cited

U.S. PATENT DOCUMENTS

| | | | | |
|---|---|---|---|---|
| 3,612,867 A * | 10/1971 | Rabodzei et al. | ............ | 378/189 |
| 4,279,482 A | 7/1981 | Tyson | ............ | 353/65 |
| 4,383,741 A | 5/1983 | Vogl et al. | ............ | 313/524 |
| 4,449,799 A | 5/1984 | Turner | ............ | 353/39 |
| 4,537,483 A | 8/1985 | Turner | ............ | 353/39 |
| 4,621,913 A | 11/1986 | Yamada et al. | ............ | 353/39 |
| 4,818,084 A | 4/1989 | Wentz, III | ............ | 359/369 |
| 4,979,789 A | 12/1990 | Um | ............ | 385/2 |
| 5,071,241 A | 12/1991 | Brock | | |
| 5,081,350 A * | 1/1992 | Iwasaki et al. | ............ | 250/234 |
| 5,146,363 A | 9/1992 | Nagano | ............ | 359/363 |
| 5,146,368 A | 9/1992 | Fink | ............ | 359/861 |
| 5,359,417 A * | 10/1994 | Muller et al. | ............ | 356/623 |
| 5,668,660 A * | 9/1997 | Hunt | ............ | 359/380 |
| 5,671,085 A | 9/1997 | Gustafsson et al. | ............ | 359/385 |
| 5,691,840 A * | 11/1997 | Bae et al. | ............ | 359/386 |
| 5,694,242 A | 12/1997 | Omi | ............ | 359/369 |
| 5,729,385 A | 3/1998 | Nishida et al. | ............ | 359/434 |
| 5,734,498 A | 3/1998 | Krasieva et al. | | |
| 5,790,307 A * | 8/1998 | Mick et al. | ............ | 359/382 |
| 5,825,536 A * | 10/1998 | Yasunaga et al. | ............ | 359/384 |
| 5,859,727 A | 1/1999 | Tsuchiya | | |
| 5,969,852 A | 10/1999 | Kung | ............ | 359/369 |
| 6,128,128 A * | 10/2000 | Otaki et al. | ............ | 359/381 |
| 6,239,905 B1 * | 5/2001 | Toyoda et al. | ............ | 359/392 |
| 6,243,189 B1 | 6/2001 | Ribes et al. | ............ | 359/201 |
| 6,371,616 B1 | 4/2002 | Doany et al. | ............ | 353/39 |
| 6,481,850 B1 | 11/2002 | Takezawa et al. | ............ | 353/20 |
| 6,704,140 B1 * | 3/2004 | Richardson | ............ | 359/387 |

(Continued)

*Primary Examiner*—Arnel C. Lavarias
(74) *Attorney, Agent, or Firm*—Polster, Lieder, Woodruff & Lucchesi, L.C.

(57) ABSTRACT

This projection microscope (10) includes an elongate support member (12) carrying a stage assembly (22) between its ends, the stage assembly (22) having opposed sides and an associated specimen holder (28). A light emitting source (24) and a light receiving point (26) are spaced from the stage assembly (22), the linear distance between them defining an optical path (100). An adjustable mirror assembly (18, 19) is carried at one end of the support member (12) including laterally spaced first and second mirrors (18, 19), the first mirror (18) receiving light from the light emitting source (24) and the second mirror (19) directing light to the light receiving point (26). An objective lens assembly (30) is disposed between the stage assembly (22) and the first mirror (18), and a secondary lens (40) is disposed between the second mirror (19) and the light receiving point (26).

23 Claims, 9 Drawing Sheets

U.S. PATENT DOCUMENTS

2001/0003489 A1    6/2001  Shiba et al.
2001/0024320 A1*   9/2001  Okada ........................ 359/368
2002/0041438 A1*   4/2002  Takahama et al. .......... 359/363
2004/0156109 A1    8/2004  Hoover et al.

* cited by examiner

PROJECTION MICROSCOPE

BACKGROUND OF THE INVENTION

This invention relates generally to microscopes and particularly to a projection microscope having high magnification and resolution.

The device known as a microscope has been available since about 1650. Essentially, such devices provide a means of making objects appear much larger than they are and are particularly useful for the study of biological specimens. They consist of an illumination source that lights the specimen, a stage that holds the specimen in place and, above all an optical system that provides the requisite degree of magnification, that is, the size of the image of the specimen compared with the actual size of the specimen. The image is viewed by the human eye or a technological substitute for the eye, such as a video camera.

Conventional compound microscopes comprise essentially of two optical elements, namely, an objective lens and an ocular lens. The objective lens forms a real, aerial inverted image at some point along the optical axis of the system. Conventionally, this inverted image is located at a point inside the front focal length of the ocular lens. The ocular lens on the other hand, accepts ray bundles from the aerial image and forms a magnified virtual image located at, or close to, infinity. Accordingly, the eye receives collimated light which is necessary for ease of observation. Usually, the aerial image distance and the focal length of the ocular lens are accommodated within the length of the microscope barrel, usually about 6 ins.–8 ins. long.

There have been many attempts to improve on the basic microscope discussed above but most improvements, particularly to the optical system tend to be very expensive, with little gained for the high cost. Accordingly, individual microscopes with high quality magnification and resolution are out of the economic reach of schools, and similar teaching establishments which prefer to have one microscope for each student.

Several prior art references disclose the use of a folded light path, which increases the length of the light path. References of particular interest are U.S. Pat. No. 4,818,084 (Wentz III); U.S. Pat. No. 5,969,852 (Kung), and U.S. Pat. No. 4,537,483 (Turner). All three references employ the same principle wherein the ocular lens of a conventional microscope is replaced by an optical system which projects a real image onto a rear projection screen. In the case of Turner and Wentz III the projection screen is viewed using a large diameter low power lens which provides additional image magnification. Neither one, however, provides the high magnification at low cost. Also U.S. Pat. No. 5,671,085 (Gustafsson, et al.) discloses the use of opposing objective lens but in a specific arrangement directed to stereoscopic imagery. These four patents are incorporated herein by reference.

It is the aim of this invention to provide a projection microscope that overcomes these problems in a manner which results in an efficient yet cost effective instrument.

SUMMARY OF THE INVENTION

This projection microscope is intended to provide excellent magnification and resolution without the need for complicated parts. It has easy-to-operate adjustments, which are readily accessible and it can be used in conjunction with commercially available video cameras to produce a large image so that individual microscopes for each student are unnecessary.

Importantly the projection microscope has a sturdy support structure for the component parts, especially the stage and the optical and illumination systems.

This projection microscope comprises an elongate support member including opposed ends; a stage assembly disposed between the ends of said support member and being carried by said support member, said stage assembly having opposed sides and an associated specimen holder. A light emitting means is disposed in spaced longitudinal relation from said stage assembly on one side thereof and a light receiving means is disposed in spaced longitudinal relation from the stage assembly on the other side thereof. A mirror assembly is carried by said support member and includes laterally spaced first and second mirrors, said first mirror receiving light from said light emitting means along a first optical path and said second mirror directing light to said light receiving means along a second optical path. An objective lens assembly is disposed between said stage assembly and said first mirror, and a secondary lens is disposed in the light path in spaced relation from the second mirror. A collimator assembly is disposed between said light emitting means and said stage.

It is an aspect of this invention to provide that the stage assembly is fixedly attached to the support member and another aspect to provide that the mirror assembly is adjustably mounted to the support member.

It is still another aspect of this invention to provide that the objective lens assembly is adjustable, and yet another aspect of this invention to provide that the collimator assembly is adjustable and includes a light conditioning lens.

It is an aspect of this invention to provide that the secondary lens is disposed in said second optical path; and another aspect to provide that the light receiving means includes a video camera.

It is an aspect of this invention to provide that the support member includes a pair of rails and the mirror assembly movably mounted to the rails. A counterweight is connected to the mirror assembly by a flexible element as part of the adjustable means.

It is another aspect of this invention to provide a guidance system comprising a plurality of posts and associated arms provide an adjustment system for at least the objective lens and the collimator lens.

The present projection microscope provides a long, folded light path which produces very high magnification from the microscope. It is readily adaptable to closed circuit TV and provides the advantage of matching the resolving power of the objective lens with the resolving power of a selective closed circuit TV system and increases the magnification by combination with the zoom capability of the TV camera.

This projection microscope is relatively easy and inexpensive to manufacture, install and operate and is particularly effective for its intended purpose.

DESCRIPTION OF A PREFERRED EMBODIMENT

Figure 1:
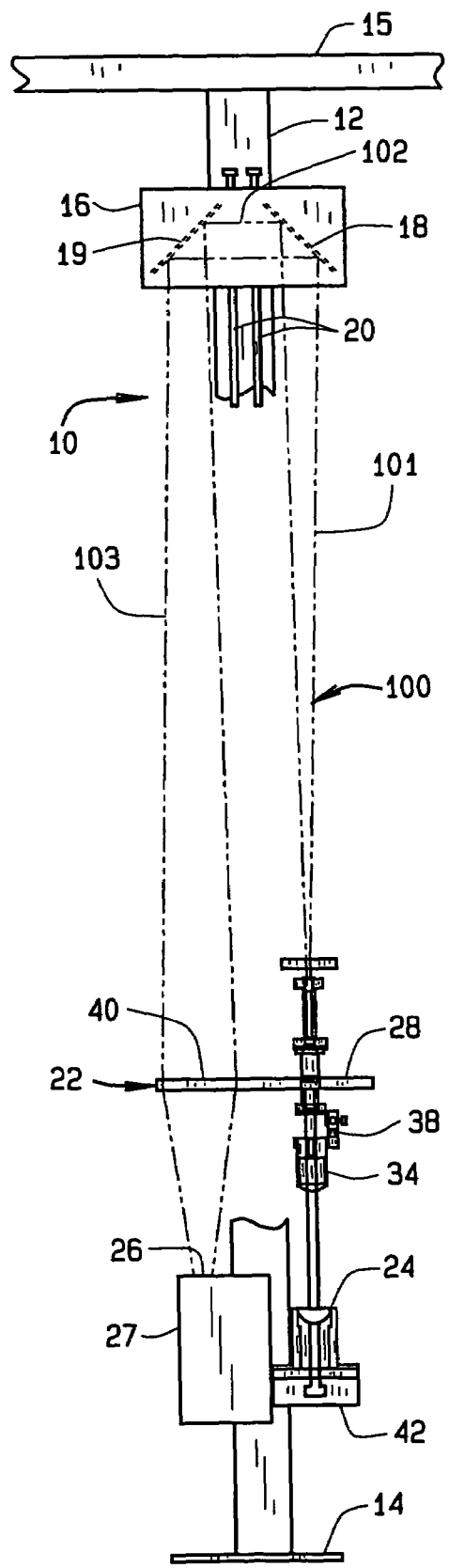
FIG. 1 is a simplified elevational view of the microscope.

Nomenclature The terms of art used in the description are provided below

Light Source Any source of light with operator control of intensity and light distribution.

Collimator A collimator provides a means of selecting and concentrating light from the light source into a uniform beam or column of light directed perpendicularly at the specimen holding stage.

Collimator Output Conditioning Lens An optional lens system selected by the operator placed between the collimator and the specimen. This lens system may be moved a selected distance from the specimen to control the location and distribution of light at the specimen level to achieve the desired image quality when viewed at a monitor screen.

Stage The stage is a platform for holding the specimen on a plane perpendicular to the light directed at the specimen. The operator can move the specimen in the x and y axes of the plane to position the specimen.

Objective Lens The objective lens is selected by the operator and can be adjusted to move the lens a selected distance from the specimen to bring the specimen into clear focus.

Diverging Lens An optional low power negative lens system selected by the operator. This lens system modifies magnification. As the image carrying light leaves the objective lens, the image becomes larger in proportion to the distance moved along the optical path away from the objective lens. The diverging lens effectively causes a slight change in magnification for the same distance.

Secondary Lens A secondary lens is used to retrieve and modify the image size at the image viewpoint.

Light Path Distance The length of the light path, which is the total distance traversed by the light emerging from the light source to the plane containing the secondary lens, directly affects the degree of magnification. The practical limit of useful magnification depends on the intensity of the light, which becomes less as the light path increases. Varying the length of the light path enhances the size of the image produced by the objective lens.

Directing Mirrors Within the light path distance directing mirrors can be used to turn or reverse the light path distance or to vary the length. Reversing the light path is optional but is useful in compacting the size of the microscope.

Image Viewpoint The image viewpoint is the point where the image is retrieved. It refers to a location in space rather than a device. It can be the human eye or a camera used with a display such as a monitor or a television.

Although light path folding by the use of mirrors is common in optical instruments such as telescopes, it is not common in microscopes where equipment compactness is important.

In microscopes, in general, the ocular or eyepiece lens is used to magnify the image produced by the objective lens. In this microscope, however, the image is allowed to grow in size by providing a long throw distance, which is effectively halved by a 180 degree turnaround created by the mirror box. This turnaround permits the image produced by the objective lens to almost double in size while without increasing the length of the equipment and while retaining image quality.

The use of collimator light sources is common in microscope technology. What is not common is the use of an inverted standard microscope objective lens to further condition the light in such a way that the only penalty is a reduction in size of the illumination patch at the specimen slide.

Figure 17:
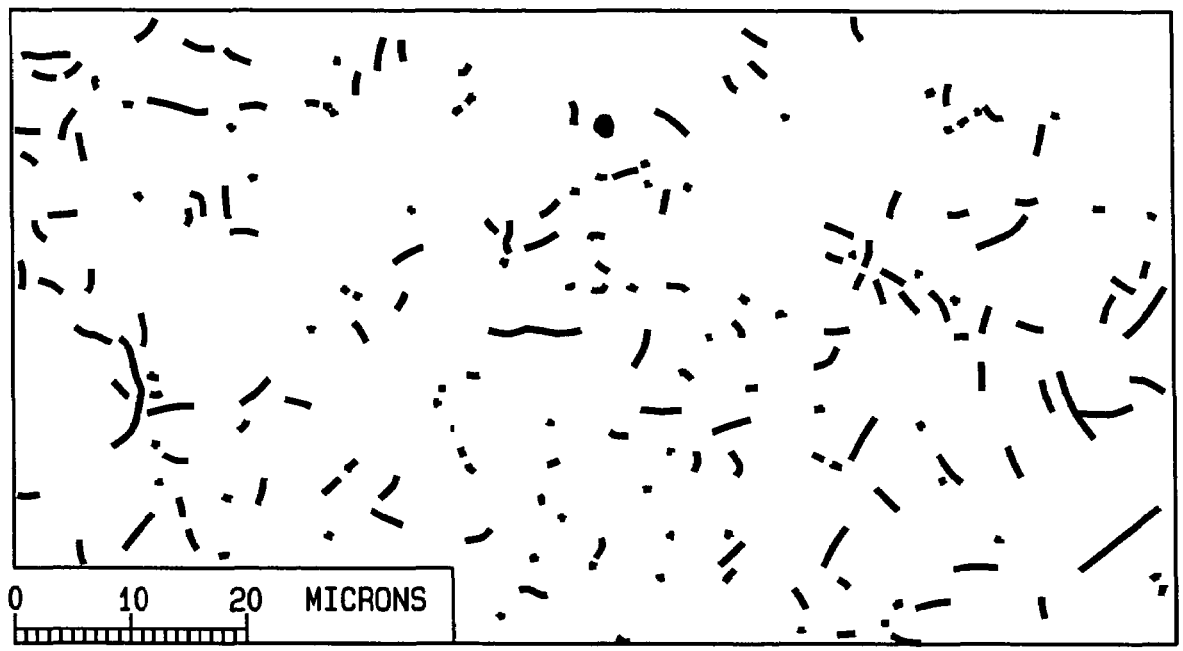
FIG. 17 is a representation of a television image of a living *e-coli* specimen magnified to about ×1400.

In addition to these advantages, the use of a secondary lens as a means of sampling the image is not known in the prior art and permits the sampling of a focused image behind the secondary lens as a by product of the long image throw distance. As an example, in an *e-coli* image, the overall magnification shown in FIG. 17 is about 1400:1 using a 20:1 objective lens. This magnification includes magnification due to image throw distance and additional magnification provided by the cctv camera zoom lens. In the preferred embodiment this objective lens is manufactured by Fisher Scientific of Pittsburgh, Pa. catalog number 1256120A.

Figure 2:
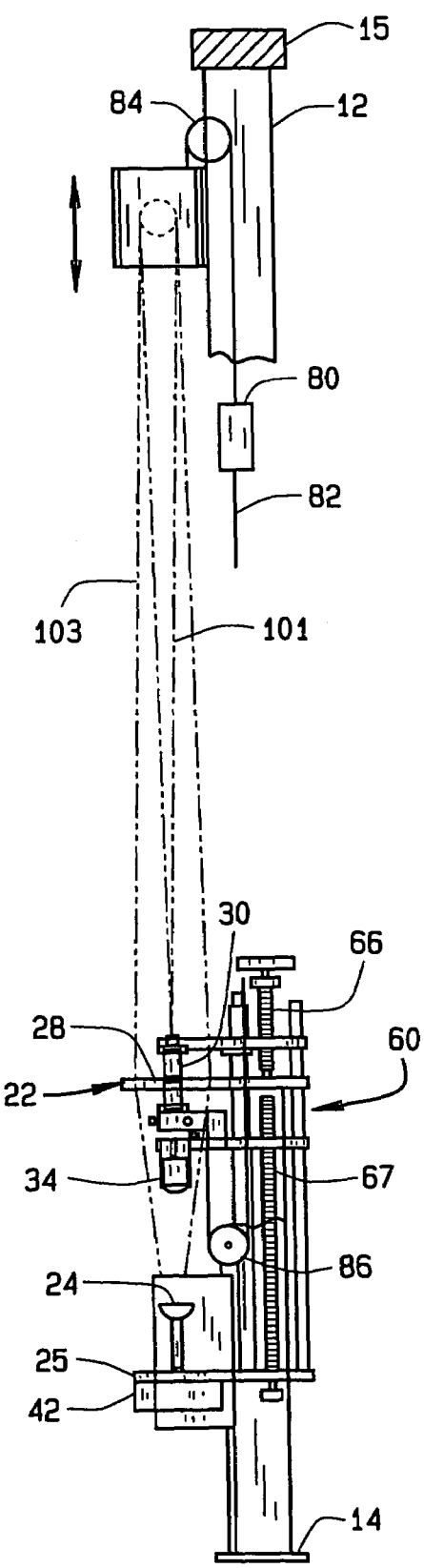
FIG. 2 is a simplified side view of the microscope.

Referring now by reference numerals to the drawings and first to FIGS. 1 and 2 it will be understood that the projection microscope 10 includes an elongate post 12 mounted on a base plate 14 and stabilized at its upper end as by attachment to an overhead beam 15. The post 12, in the embodiment shown is ell-shaped, and carries the several components that comprise said microscope 10.

At the upper end of the post 12 there is provided a mirror assembly 16 consisting of opposed mirrors 18 and 19 inclined, in the embodiment shown, at 90° to each other. The mirror assembly 16 is adjustably mounted on a pair of rails 20, which are fixedly attached to the post 12 at their upper end.

Intermediate the upper and lower ends of the post 12 is a stage assembly 22 for an objective lens arrangement 30, which will be described below, and at the lower end, on one side of the post 12 and aligned with mirror 18, is a light emitting source 24. On the other side of the post 12, and aligned with the mirror 19, a light receiving point 26 is provided as by a video camera 27. The rails 20 are attached to the stage at their lower ends as by set screws (FIG. 8).

The stage assembly 22 includes, on one side, a slide holder 28 having x and y movement capability to align the slide specimen S accurately with the optical path 100 between the mirror 18 and the light emitting source 24.

Figure 12:
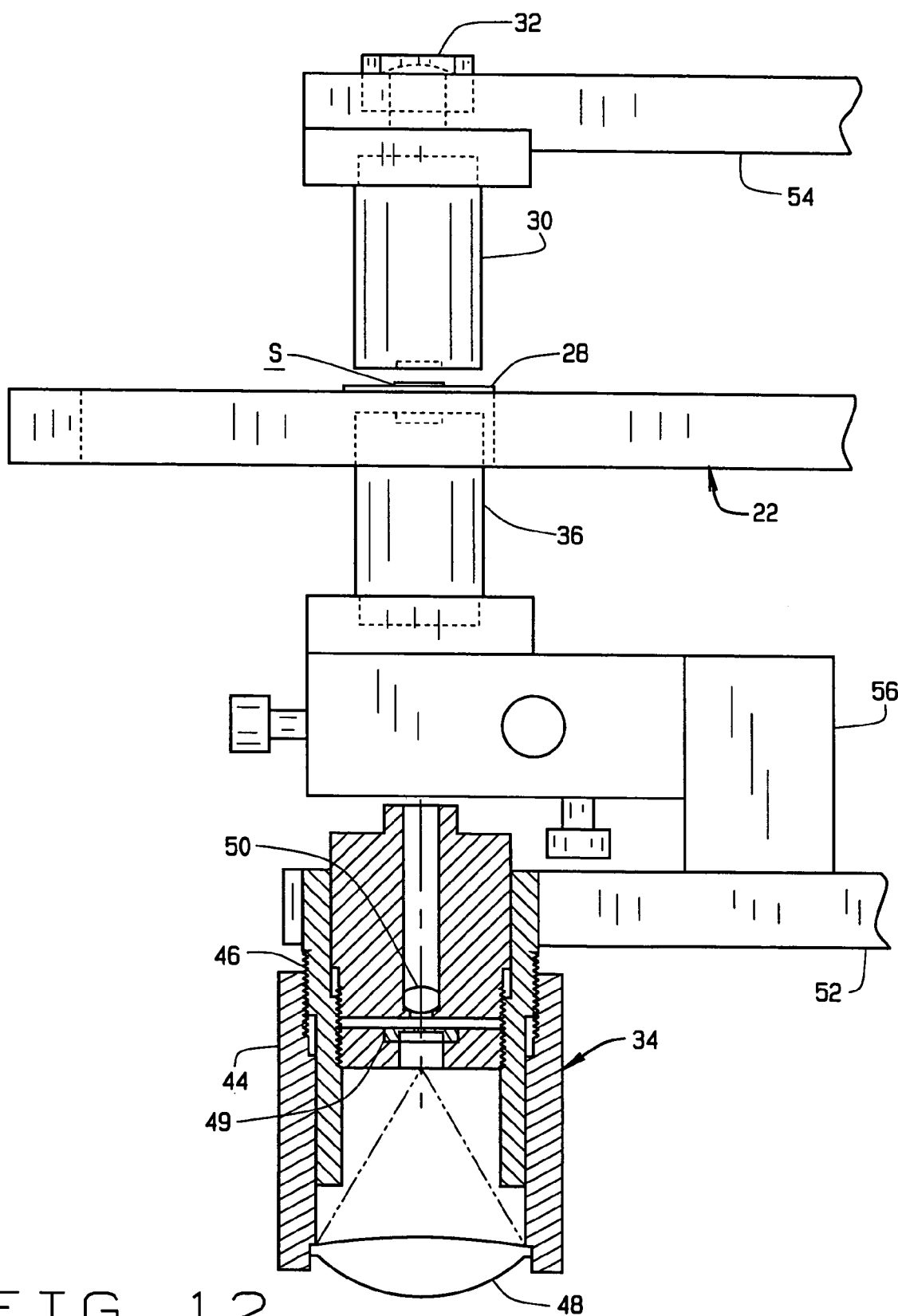
FIG. 12 is an enlarged sectional view of the collimator assembly and the objective lens assembly.

Above the slide holder 28, as best shown in FIG. 12, is a lengthwise adjustable objective lens 30, which may be surmounted by a low power diverging lens 32. Below the slide holder 28 is a lengthwise adjustable collimator 34, which receives light from the light emitting source and which may be surmounted by a lens 36 for light conditioning. Lens 36 may be a microscope objective lens similar to the objective lens 30.

Figure 5:
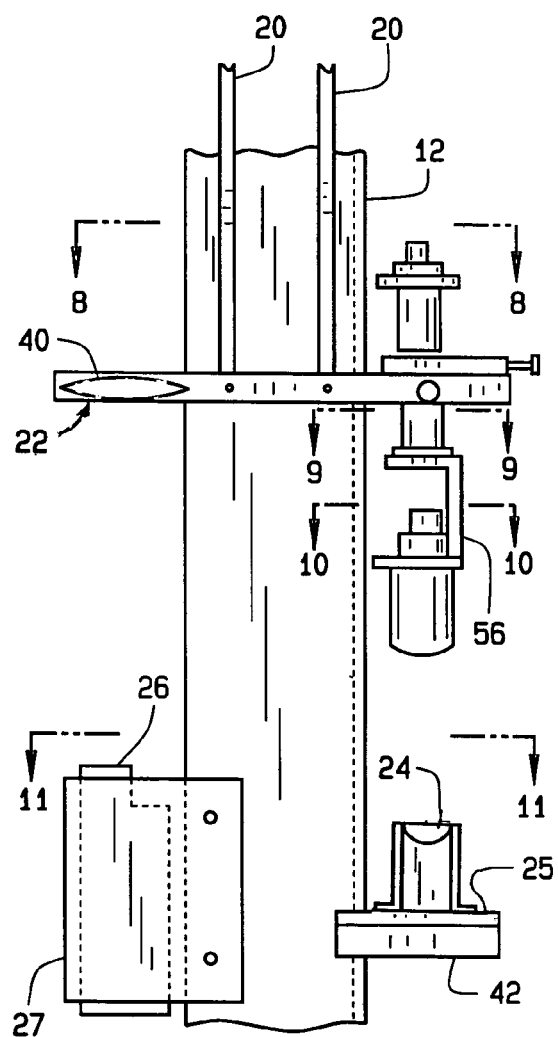
FIG. 5 is an enlarged fragmentary view of the lower portion of FIG. 1.
Figure 8:
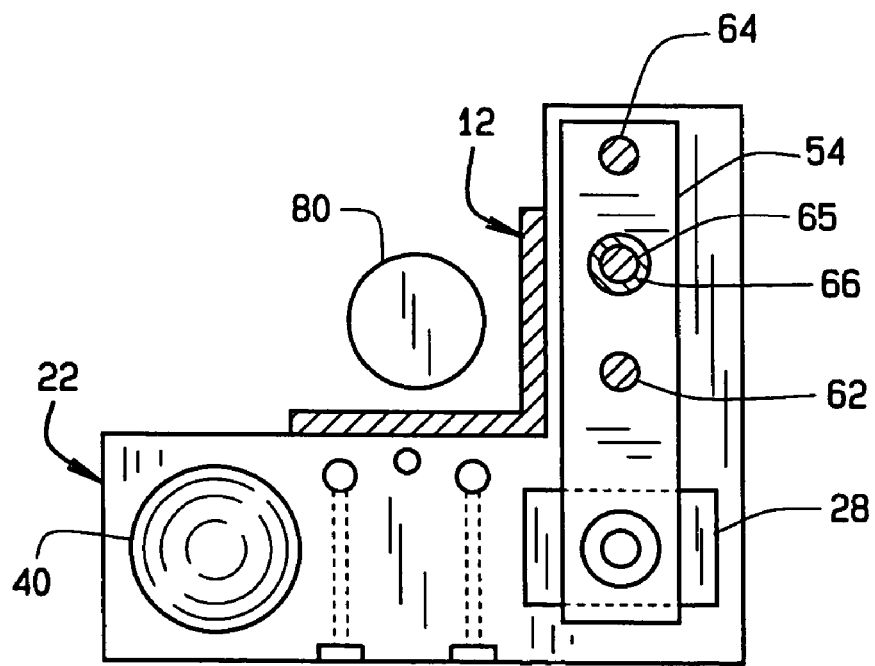
FIG. 8 is a cross sectional view taken on line 8—8 of FIG. 5.
Figure 9:
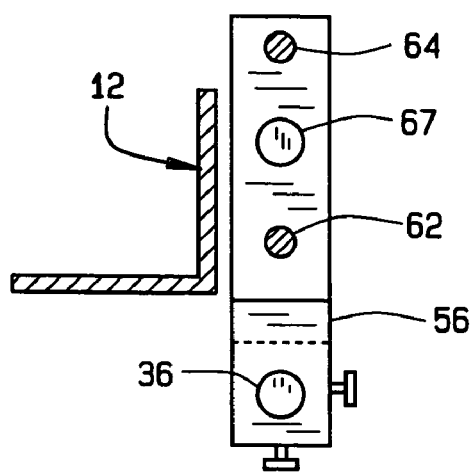
FIG. 9 is a cross sectional view taken on line 9—9 of FIG. 5.
Figure 10:
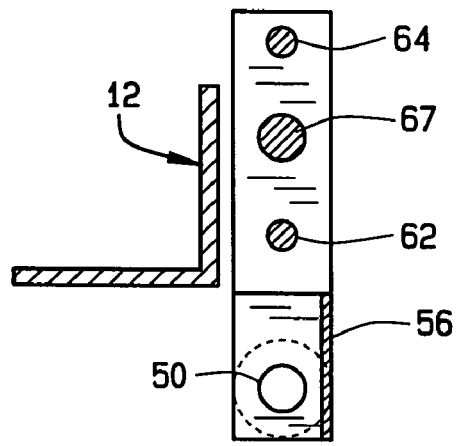
FIG. 10 is a cross sectional view taken on line 10—10 of FIG. 5.

On the other side of the stage assembly 22, best shown in FIGS. 5 and 8, is a relatively large diameter secondary lens 40, which is disposed in the optical path between the mirror 19 and the light receiving point 26 provided, in the embodiment shown, by the video camera 27.

Essentially, then, the optical path 100 from the light emitting source 24 to the light receiving point 26 shown in FIGS. 1 and 2 is in several portions. The optical path 100, in the embodiment shown, extends upwardly from the light emitting source 24 to the mirror 18 by way of the collimator assembly 34, the slide holder 28 and the objective lens 30. The optical path then extends laterally from the mirror 18 to the mirror 19. Finally, the optical path extends downwardly from mirror 19, by way of the secondary lens 40, to the light receiving point 26 provided by the video camera 27.

In the embodiment shown, the optical path includes a first portion 101 extending from the specimen holder 28 to the first mirror 18, an intermediate portion 102 extending between the mirrors 18 and 19 and a second portion extending from the mirror 19 to the secondary lens 40. The first and second optical path portions 101 and 103 combine to provide magnification and resolution greater than that specified by the objective lens manufacturer.

Figure 11:
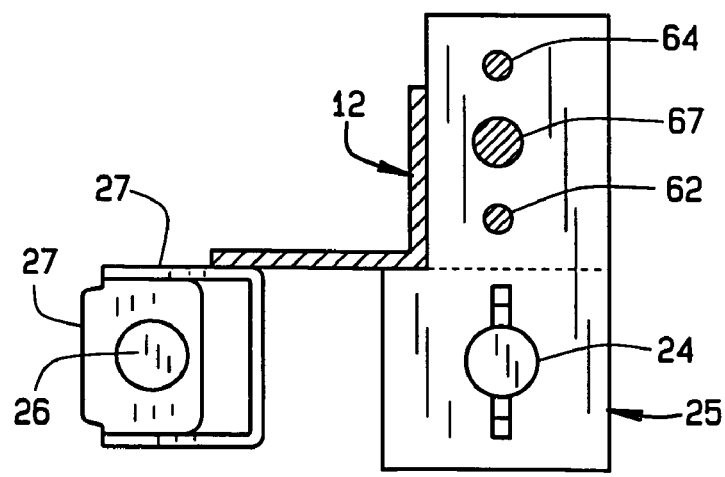
FIG. 11 is a cross sectional view taken on line 11–11 of FIG. 5.

More specifically and referring individually to the various microscope components, the light emitting source 24, in the embodiment shown, may be provided by a spotlight (FIG. 11) equivalent in intensity to an incandescent light bulb of at least 250 watts and having an associated cooling fan 42.

The collimator assembly 34 is shown in detail in FIG. 12 and includes threadedly adjustable outer and inner sleeves 44 and 46 respectively, the outer sleeve providing a holder for a collector lens 48 held within the outer sleeve 44, and the inner sleeve 46 providing a holder for a threaded insert constituting a collimator lens 50 which directs the light bundles into parallel paths.

Figure 6:
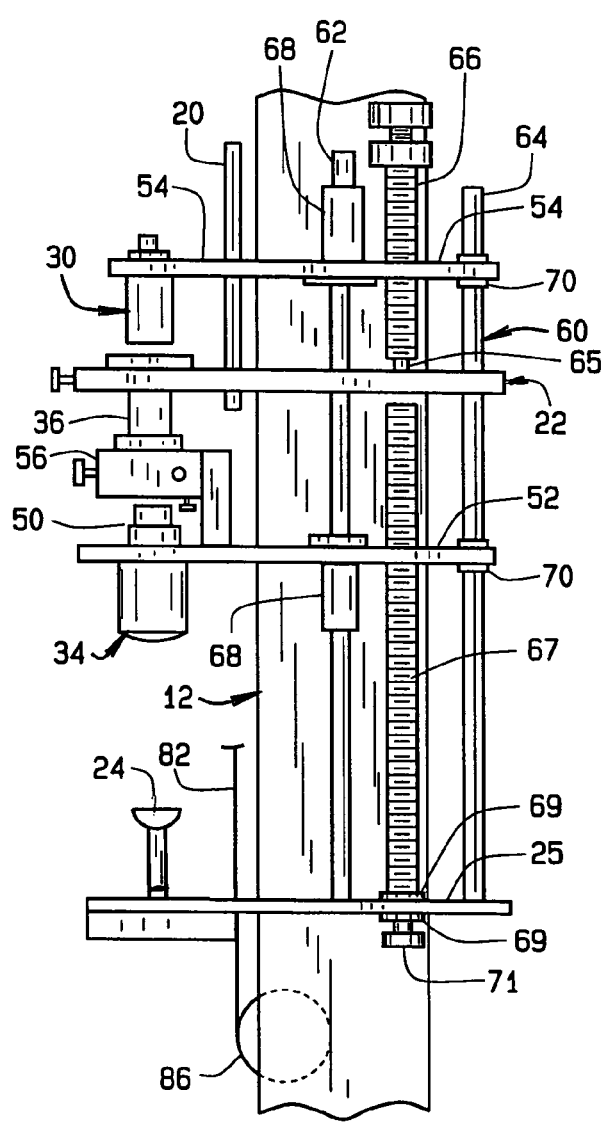
FIG. 6 is an enlarged fragmentary view of the lower portion of FIG. 2.

As shown in FIGS. 5 and 6, the collimator assembly 34 is vertically adjustable by means of an arm 52 forming part of a guide rod system generally indicated by numeral 60. On the arm 52 is mounted a holder 56 which provides an x, y, and z adjustment for the conditioning lens 36, said lens being disposed between the objective lens 30 and the collimator assembly 34. The holder 56 is of the type available from National Aperture Inc. of Salem N.H. under the model number MM-1 Manual Microsmini™. The objective lens assembly 30 also includes a vertically adjustable objective lens arm 54 for holding said objective lens assembly 30 in place above the slide holder 28 on the stage assembly 22. In the embodiment shown the conditioning lens 36 is provided by an inverted objective lens.

The guide rod adjustment system 60, supporting the adjustable arms 52 and 54, includes a pair of vertical guide rods 62 and 64, which pass through the stage assembly 22 and are supported at the lower end by the light platform 25, which may be fixedly attached to the post 12. The light platform 25 also provides support for the spotlight, providing the light emitting source 24, and the cooling fan 42. Aligned upper and lower threaded adjustment posts 66 and 67 best shown in FIG. 6 are disposed between the two guide rods 62 and 64. Guide rod 62 is provided with oppositely disposed collared bushings 68 and guide rod 64 is provided with bushings 70, one bushing 68 and one bushing 70 being provided in arm 52 and in arm 54.

In the embodiment shown, the upper adjustment post 66 extends from above arm 54 down to stage 22. Post 66 is an externally threaded rod which is received within a threaded opening in arm 54 to provide a coarse vertical adjustment by rotating a fixed knob 61. The post 66 includes a passage therethrough, having a threaded relatively short upper end portion, receiving a finely threaded screw 63, and a lower reduced diameter unthreaded portion receiving an elongate pin 65. The pin 65 extends from the underside of the screw 63 and outwardly of the rod 66 to engage the stage 22. By this arrangement, coarse adjustment is achieved by the rotating of the externally threaded rod 66 by the fixed knob 68, said rod having 11 threads per inch, and fine adjustment is achieved by rotating the finely threaded screw 63 having, in the embodiment shown, about 80 threads per inch.

The lower adjustment post 67 is externally threaded similar to post 66 and, in the embodiment shown, is received by a threaded opening in the arm 52. Lower post 67 is received through unthreaded openings in the light platform 25, and is held in place by retainer washers 69 by set screws in said washers. The lower post 67 includes a knob 71 fixedly attached to the lower end of the post 67.

It will be understood that the adjustment post 66 provides coarse and fine adjustment for the arm 54 and therefore for the objective lens assembly 30 mounted to said arm.

It will also be understood that the adjustment post 67 provides coarse adjustment for the collimator assembly 34 and fine adjustment is provided by the holder 56 as discussed above.

Figure 3:
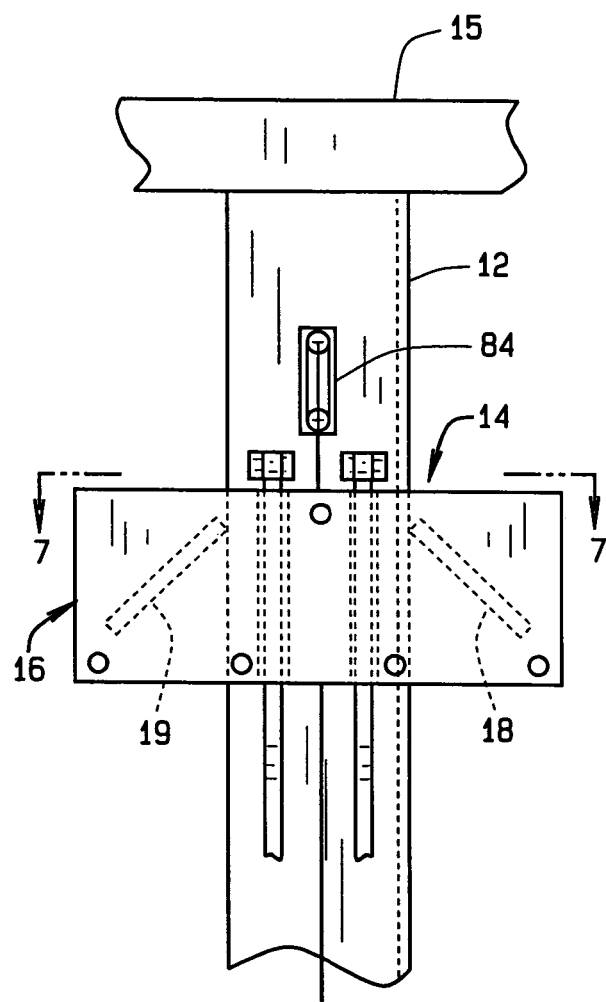
FIG. 3 is an enlarged fragmentary view of the upper portion of FIG. 1.
Figure 4:
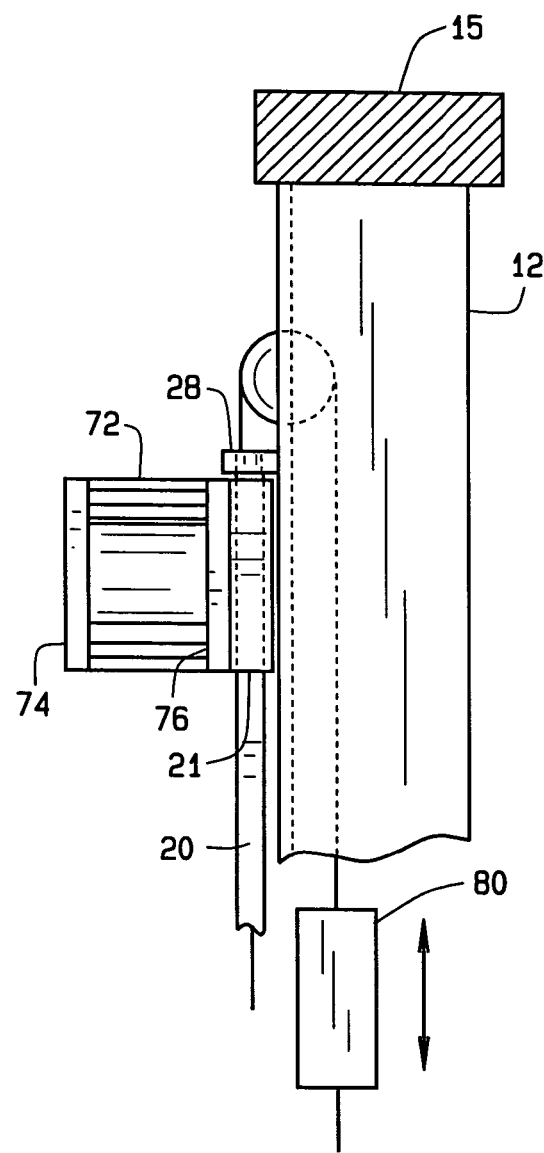
FIG. 4 is an enlarged fragmentary view of the upper portion of FIG. 2.
Figure 7:
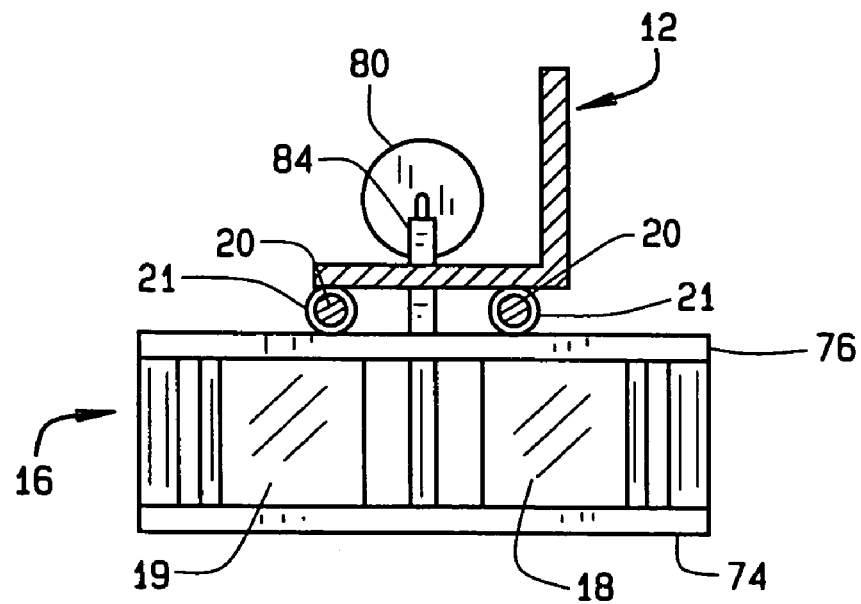
FIG. 7 is a cross sectional view taken on line 7—7 of FIG. 3.

As best shown in FIGS. 3, 4, and 7 guide rails 20 are fixedly attached to the post 12 at their upper end and the mirror assembly 16 includes front and rear plates 74 and 76 providing a housing 72, within which the mirrors 18 and 19 are mounted in planes perpendicular to each. This arrangement provides that light upwardly directed from the light emitting source 24 to mirror 18 is downwardly directed from mirror 19 to light receiving point 26 provided by the camera 27. The mirror housing rear plate 76 is provided with bushings 21 fixedly attached to said rear plate 76 so that the housing 72 is received by said rails 20 in sliding relation. The elevation of the mirror assembly 16 is balanced by means of a counterweight 80 disposed between the adjacent legs of the ell-shaped post 12. The counterweight 80 is attached to the mirror housing 72 by means of a flexible cable loop 82, the cable having one end attached to the counterweight 80, the other end being passed over and under pulleys 84 and 86 respectively, freely rotationally mounted at the upper end and the lower end, respectively, of the post 12 and attached to the other end of the counterweight 80. There is sufficient friction provided by this rail mounted and balanced arrangement so that the counterweight mirror assembly 16 can be readily moved vertically to vary the length of the optical path 100, by adjusting the height of the mirror assembly 16 between the light emitting source 24 and the light receiving point 26 provided by the video camera 27. The video camera 27 may be connected to a television monitor (not shown) mounted remotely from the video camera 27. Video camera 27 may be provided with a variable field angle capability to provide additional specimen enlargement at the remote monitor.

It is thought that the structural features of this projection microscope have become fully apparent from the foregoing description of parts but for completeness of disclosure, the operation of the microscope will now be briefly described.

The several component adjustments, readily available to the operator, simplify considerably the use of this projection microscope. For example, in the embodiment shown the elongate post 12 is about 7 to 8 feet long and all components are easily accessible.

Initially, the slide specimen S is placed in the slide holder 28, (FIG. 12), which is adjustable, in the x and y directions, to provide proper alignment with the appropriate objective lens 30. The objective lens 30 is selected by the operator to suit the slide specimen, as is the optional diverging lens 32.

Figure 15:
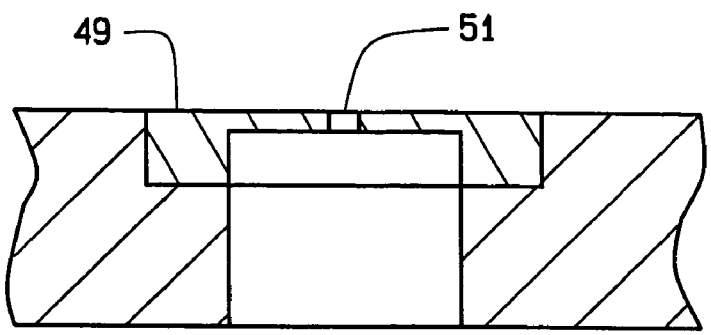
FIG. 15 is an enlarged fragmentary portion of FIG. 12.
Figure 16:
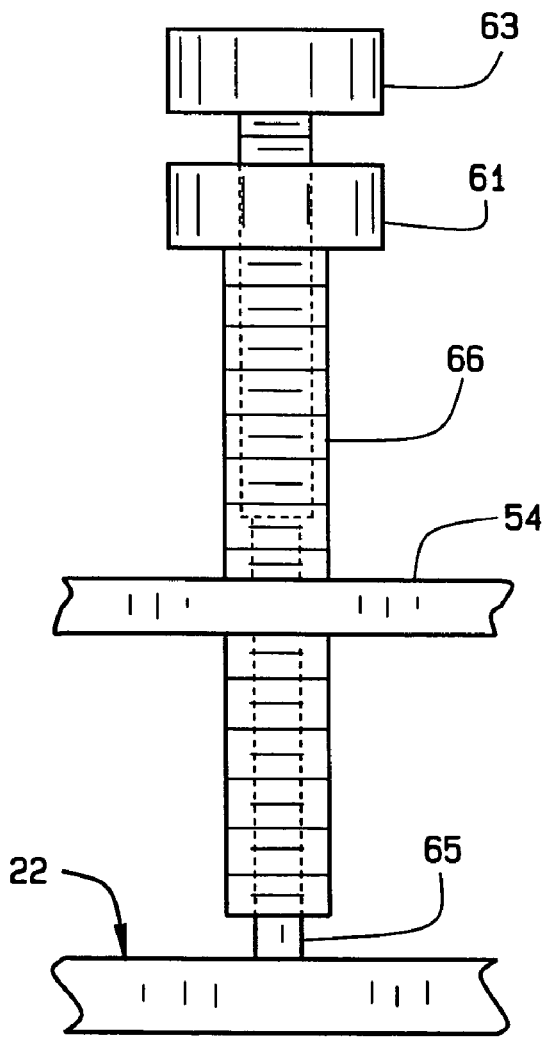
FIG. 16 is an enlarged fragmentary portion of FIG. 6 showing the coarse and fine screw arrangement.

The vertical adjustments of the objective lens assembly 30 and the collimator assembly 34 are achieved by moving the arm 54 and the arm 52, respectively. Coarse and fine adjustment of the objective lens 30 are provided by the adjustment post 66. Coarse adjustment of the collimator is provided by the adjustment post 67 moving the arm 52 vertically. It will be understood that the conditioning lens 36 is carried by a holder 56 (FIG. 12), which provides for horizontal alignment with the optical path 100 and additional vertical alignment and thereby x, y, and z adjustment. Also the collimator assembly 34 is provided with additional vertical adjustment by means of the threadedly connected outer and inner sleeves 44 and 46, as shown in FIG. 12. This arrangement provides for movement of the lens 50 relative to the pin hole 51 which is disposed vertically between lens 50 and lens 48. In the embodiment shown in FIG. 15, the pin hole is provided by a replaceable washer 49 having a thin web in which the pin hole is placed so that the pin hole can readily be selected to suit the operator.

The mirror assembly 16 may then be arranged at a suitable elevation by moving the mirror assembly 16 on the rails 20 manually by means of the counterweight cable 82.

The stage assembly 22 is fixedly attached at a height, for example 30 inches, for seated observers to make various adjustments of the components, in the vicinity of the stage assembly 22, conveniently.

From the above it will be seen that focus adjustments are easily made and increase the clarity of the specimen image. It will be understood that the availability of these adjustments provides this projection microscope with the capability of producing excellent images, not only on the monitor but also at the secondary lens stage, where this is desirable.

Figure 13:
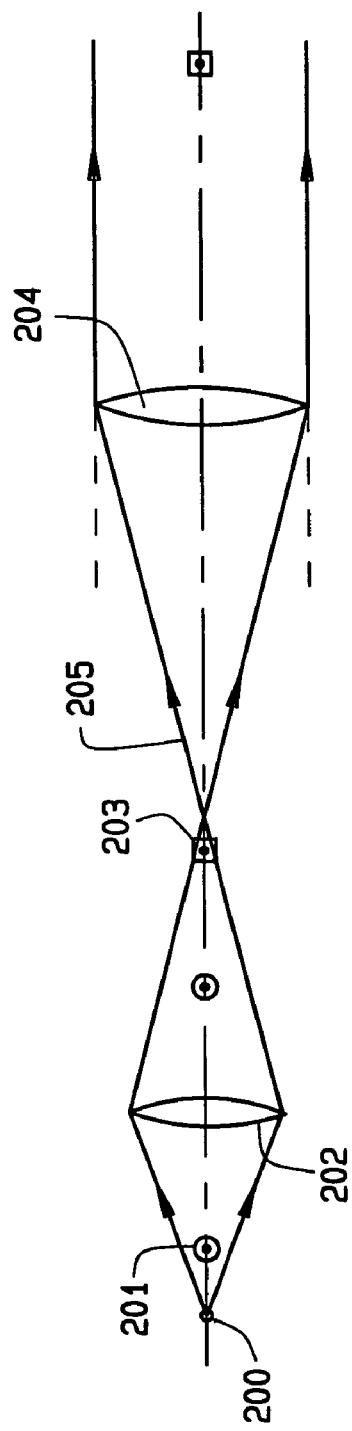
FIG. 13 is a diagrammatic rendering of the raytrace of a conventional microscope.
Figure 14:
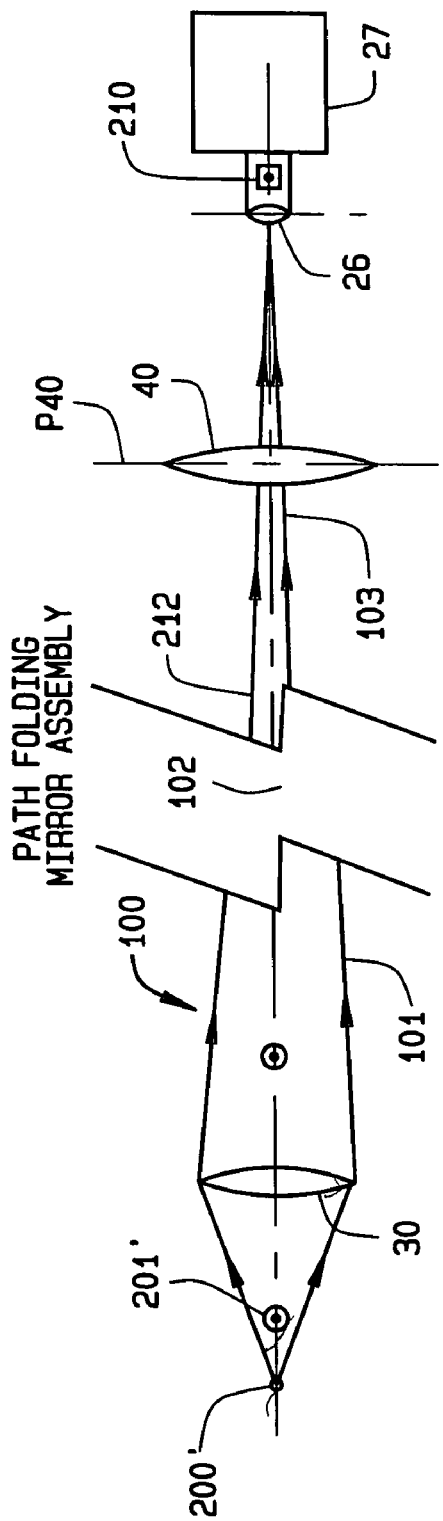
FIG. 14 is a diagrammatic rendering of the raytrace of the microscope of the invention herein

For the purposes of comparison, FIGS. 13 and 14, respectively, show portions of a ray trace for a conventional microscope and a ray trace for the disclosed invention, the projection microscope. The issuance of a ray bundle originating from an object point on the optical axes of both systems is shown.

Referring first to FIG. 13. In a conventional compound microscope, light rays from object point 200 are brought to a focus at a point fractionally inside the axial focal length 203 of an ocular lens 204. The diverging ray bundle 205 is captured by the ocular lens 204 and forms a magnified virtual image with rays diverging from a distant point in the object space of the ocular lens.

Referring now to FIG. 14. In the projection microscope of the invention, light rays originate from object point 200', which is located closer to objective focal point 201' than shown in FIG. 13. These rays, 212, shown in FIG. 14, form an inverted, real aerial image in the image space of the objective lens. In the conventional microscope (FIG. 13) the objective lens image space is restricted in the interest of shortening the microscope barrel length, and the image size is increased by the specified magnification of the ocular lens 204. In the present invention, the real aerial image size is permitted to grow along a much longer optical path, folded by the adjustable mirror assembly 16, as shown in FIG. 1.

Extensive experimental work has clearly demonstrated that moderately well corrected commercially available microscope objective lenses are capable of image magnification, considerably in excess of the manufacturer's specified magnification, without significant loss of image quality. Thus, by judicious selection of the location of the mirror assembly 16, an ×20 objective lens 202 is capable of producing a high quality aerial image at ×300, for example, at a throw distance considerably greater than that possible in a conventional microscope due to the limitations imposed by a conventional microscope barrel length. When coupled with, for example, zoom capability of 5:1 of a cctv camera lens the magnification is about ×1400.

Referring again to FIG. 14, collimator 34, (FIG. 12), directs a narrow beam of collimated light towards object point 200'. This beam is further conditioned by an adjustable inverted microscope objective lens 36, which changes the diameter and intensity of the light disk entering the specimen S. In a typical application, an ×20 objective lens 30, (FIG. 12) can be used to create a real, aerial image in the objective lens image space at a distance of several feet. Due to a combination of the illumination disk diameter and objective lens 30 field angle, this image remains in clear focus over significant distances along the light path between objective lens 30 and secondary lens 40. This image can be readily observed experimentally by placing a diffusing screen in the light path, and in particular at the plane P40 (FIG. 14) containing the secondary lens 40 at the stage 22 (FIG. 1.), which is where the maximum size of the image occurs in the embodiment shown. The secondary lens 40 is a simple biconvex lens with focal length, in the embodiment shown, of approximately 12 inches and a diameter of approximately 4 inches. The secondary lens 40 in a typical application collects ray bundles from an image size of approximately 4 inches in diameter. A series of in-focus, real aerial images of decreasing size can be sampled in the image space of lens 40 between the plane of the lens 40 and its back focal point 210. A closed circuit television camera 27, in conjunction with lens 26 of the camera, is used to sample and capture an image appearing in the image space of secondary lens 40.

It will be understood, that since the image produced by the objective lens 30 can be varied in size by adjusting the position of the mirror assembly 16, and since the view field angle is variable and selectable by choice of closed circuit camera lens type, the image size produced by objective lens 30 can be so selected that the image resolution can be accurately matched with the bandwidth of a given closed circuit television system.

In the embodiment shown, the microscope objective lens 30 disposed above the slide as an imaging objective lens may be an off-the-shelf lens of the type available from Fisher Scientific as discussed above. Also in the embodiment shown, the conditioning lens 36 disposed below the slide to condition the lighting of the specimen may be the same or a similar lens used in the inverted condition.

This arrangement of structural and optical parts readily lends itself to appropriately designed servomechanisms and sensors (not shown) which could be employed, for example, to link the transport mechanism mirror assembly 16, FIG. 1 and the field angle and focus mechanisms of the cctv camera, thus providing an automatic matching capability between the resolving power of the closed circuit television system and the information content of the image generated by the objective lens 30.

Although the invention has been described by making detailed reference to preferred embodiments, such detail is to be understood in an instructive rather than in any restrictive sense, many other variants being possible within the scope of the claims hereunto appended.

We claim:

1. A projection microscope comprising:
   an upright elongate support member including opposed ends;
   a stage assembly transversely disposed between the ends of said support member and being carried by said support member, said stage assembly having opposed sides and an associated specimen holder;
   a light emitting means disposed in spaced longitudinal relation from said stage assembly;
   a light receiving means;
   a mirror assembly carried by said support member in spaced longitudinal relation from said stage assembly and including laterally spaced first and second path folding mirrors, said first mirror receiving light from said light emitting means along a first optical path extending from the specimen holder to the first mirror and said second mirror directing light to said light receiving means along a second optical path extending from said mirror to a secondary lens in lieu of a magnifying eyepiece; and
   an objective lens assembly disposed in said first light path between said stage assembly and said first mirror;
   said first and second light paths being folded by the mirrors and combining to provide increased magnification.

2. A projection microscope as defined in claim 1, wherein a collimator lens assembly is disposed between said light emitting means and said stage assembly.

3. A projection microscope as define in claim 1, wherein the mirror assembly is fixedly attached to the support member.

4. A projection microscope as defined in claim 1, wherein the mirror assembly is adjustably mounted to the support member.

5. A projection microscope as defined in claim 1, wherein the objective lens assembly is adjustable.

6. A projection microscope as defined in claim 1, wherein the objective lens assembly includes a negative lens.

7. A projection microscope as defined in claim 2 wherein the collimator assembly includes a light-conditioning lens.

8. A projection microscope as defined in claim 7, wherein the light-conditioning lens is adjustable.

9. A projection microscope as defined in claim 1, wherein the secondary lens is disposed in said optical path between said second mirror and said light receiving means.

10. A projection microscope as defined in claim 1, wherein the light receiving means includes a camera.

11. A projection microscope as defined in claim 1, wherein the light receiving means includes a TV camera and a TV monitor connected to the TV camera.

12. A projection microscope as defined in claim 9, wherein the secondary lens is an uncorrected bi-convex lens with a focal length of about 12 inches and a diameter of about 4-inches.

13. A projection microscope as defined in claim 1, wherein the objective lens assembly includes adjustment means including a post disposed perpendicularly to the stage assembly and a lens holder carried by the post in adjustable, parallel spaced relation to the stage assembly.

14. A projection microscope as defined in claim 2 wherein the collimator lens assembly includes adjustment means including a post disposed perpendicularly to the stage assembly and a collimator lens assembly holder carried by the post in adjustable parallel spaced relation to the stage assembly.

15. A projection microscope as defined in claim 1, wherein the support member is an L-shaped member.

16. A projection microscope as defined in claim 1, wherein the support member includes a pair of rails and the mirror assembly is movably mounted to the rails in adjustable relation.

17. A projection microscope as defined in claim 16, wherein a counterweight is connected to the mirror assembly by a flexible element as part of an adjustable means.

18. A projection microscope as defined in claim 8, wherein said light conditioning lens is a reversely mounted objective lens.

19. A projection microscope as defined in claim 1 in which a post guidance system and associate arms provide an adjustment system for at least the objective lens and a collimator lens.

20. A projection microscope comprising:
    an elongate support member including opposed ends;
    a stage assembly disposed between the ends of said support member and being carried by said support member, said stage assembly having opposed sides and an associated specimen holder;
    a light emitting means disposed in spaced longitudinal relation from said stage assembly;
    a light receiving means;
    a mirror assembly carried by said support member in spaced longitudinal relation from said stage assembly and including laterally spaced first and second path folding mirrors, said first mirror receiving light from said light emitting means along a first optical path extending from the specimen holder to the first mirror and second mirror directing light to said light receiving means along a second optical path extending from said mirror to a secondary lens in lieu of a magnifying eyepiece;
    an objective lens assembly disposed in said first light path between said stage assembly and said first mirror;
    a collimator lens assembly disposed between said light emitting means and said stage assembly;
    said first and second light paths being folded by the mirrors and combining to provide magnification greater than that specified by the objective lens manufacturer; and
    an adjustment system for at least the objective lens assembly and the collimator lens assembly.

21. A projection microscope comprising
    an elongate support member including opposed ends;
    a stage assembly disposed between the ends of said support member and being carried by said support member, said stage assembly having opposed sides and an associated specimen holder;
    a light emitting means disposed in spaced longitudinal relation from said stage assembly;
    a light receiving means;
    a mirror assembly carried by said support member in spaced longitudinal relation from said stage assembly and including laterally spaced first and second mirrors, said first mirror receiving light from said light emitting means along a first optical path extending from the specimen holder to the first mirror and second mirror directing light to said light receiving means along a second optical path extending from said mirror to a secondary lens;

an objective lens assembly disposed in said first light path between said stage assembly and said first mirror;

a collimator lens assembly disposed between said lighting emitting means and said stage assembly;

said first and second light paths combing to provide magnification greater than that specified by the objective lens manufacturer; and an adjustment system for at least the objective lens assembly and the collimator lens assembly;

the adjustment system including a support arm for the objective lens assembly disposed above the stage assembly and an adjustable post between the support arm and the stage assembly for moving the objective lens relative to the stage assembly and a support arm for the collimator lens disposed below the stage assembly for moving the collimator lens relative to the stage assembly and a pair of laterally spaced guide rods extending between the support arms for stabilizing the support arms during adjustment of the posts.

22. A projection microscope as defined in claim 20, wherein an adjustable conditioning lens is disposed between the objective lens and the collimator lens.

23. A projection microscope as defined in claim 22, wherein the conditioning lens is an inverted objective lens.

* * * * *

UNITED STATES PATENT AND TRADEMARK OFFICE
CERTIFICATE OF CORRECTION

PATENT NO. : 7,139,121 B2 Page 1 of 1
APPLICATION NO. : 10/871078
DATED : November 21, 2006
INVENTOR(S) : Alan W. Bogle and Russell H. Bogle It is certified that error appears in the above-identified patent and that said Letters Patent is hereby corrected as shown below:

Title Page, (73)
  Replace "Quickmate"
  With -- Quikmate --

Col. 9, Line 9
  Replace "of said support member"
  with -- of said upright support member --

Col. 10, Line 21
  Replace "an elongate support member"
  with -- an upright elongate support member --

Col. 10, Line 22
  Replace "a stage assembly disposed"
  with -- a stage assembly transversely disposed --

Col. 10, Line 23
  Replace "support member"
  with -- upright support member --

Signed and Sealed this

Thirtieth Day of October, 2007

JON W. DUDAS
*Director of the United States Patent and Trademark Office*